April 1, 1969          A. J. WHITE          3,435,530
GAUGE TO MEASURE TREAD DEPTH OF A TIRE
Filed Aug. 11, 1966
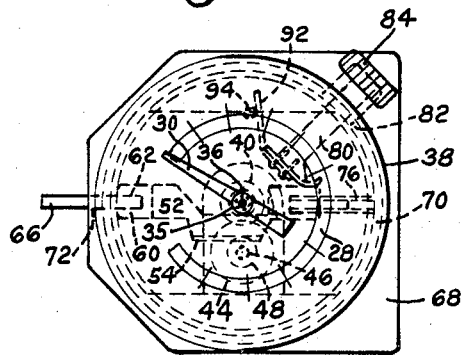
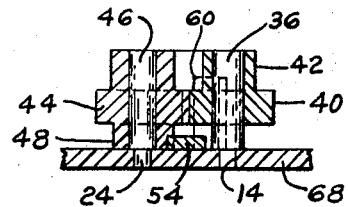
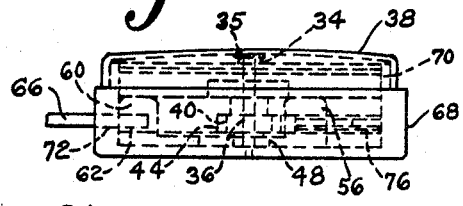
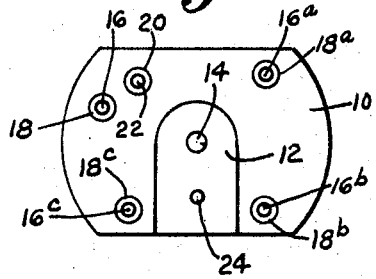
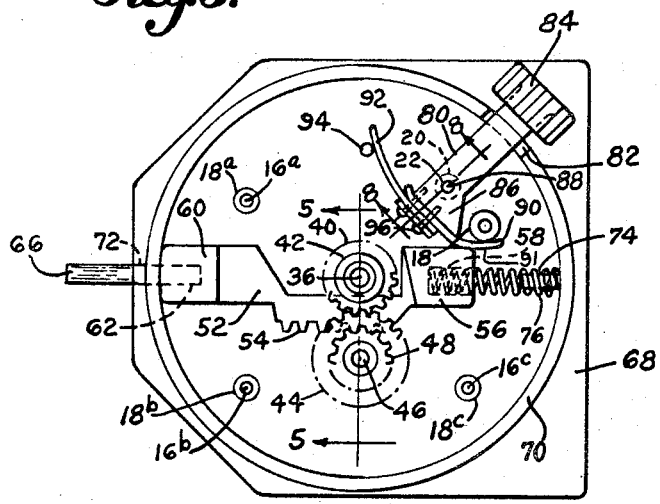
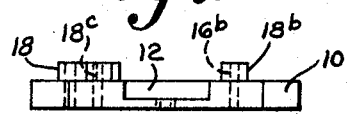
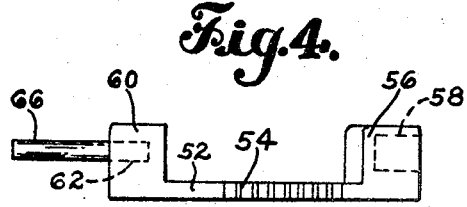
INVENTOR.
Andrew J. White
BY Harold E. Cole
Attorney United States Patent Office 3,435,530
Patented Apr. 1, 1969

3,435,530
GAUGE TO MEASURE TREAD DEPTH
OF A TIRE
Andrew J. White, Newmarket P.O.,
South Lee, N.H. 03857
Filed Aug. 11, 1966, Ser. No. 571,877
Int. Cl. G01b 3/28
U.S. Cl. 33—172                                                          2 Claims

ABSTRACT OF THE DISCLOSURE

A gauge to measure the depth of a tire tread having an actuating finger that is inserted into a space provided by said tread. Mechanism connected to said finger has an indicator that is actuated, upon said insertion, to give a reading on a dial face of said depth. A resetting lever is operably connected to said indicator and serves, upon actuation, to return the indicator to normal position.

---

One object of my invention is to provide such a gauge that has mechanism to give a reading of tread depth by merely inserting an actuating finger into a tread space, said reading appearing on a flat and relatively large dial face.

Another object is to provide mechanism whereby a pointer giving a reading of tread depth will remain on said dial face after the gauge has been removed until the latter is reset.

Still another object is to provide mechanism that is compact and simple in operation and the manner of use of which is obvious.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my invention.

In the drawing:

FIG. 1 is a plan view of my gauge.

FIG. 2 is a side elevational view thereof.

FIG. 3 is a plan view thereof with the mounting and crystal removed.

FIG. 4 is a front elevational view of a rack that forms part of the indicating means.

FIG. 5 is an enlarged, sectional view taken on the line 5—5 of FIG. 3.

FIG. 6 is a plan view of the mounting used in my gauge.

FIG. 7 is a side elevational view of said mounting.

FIG. 8 is an enlarged, sectional view taken on the line 8—8 of FIG. 3.

As illustrated, a mounting 10 has a recess 12 with a hole 14 therethrough. Four screw-threaded pins 16, 16a, 16b and 16c are set in said mounting 10, by screw-threaded connection to spacers 18, 18a, 18b and 18c respectively. Said spacer 18 serves as a bearing as later explained. A boss 20 has a hole 22 therethrough and there is a small hole 24 at said recess 12. A dial or indicia face 28, is adapted to receive suitable indicia. An indicator pointer 30 is held by a gear shaft or pin 36 rotatably set in said housing 68, and is retained by a collar 34 having a retainer head 35. Said shaft 36 extends through said dial 28, the latter being protected by a cover or crystal 38.

Indicating means includes a driven gear 40 fixed on shaft 36 and which has a hub 42 and its teeth mesh with those of a larger gear 44 rotatably mounted on a shaft 46 extending through said hole 24 and fixedly set in a housing 68. A pinion 48 is integral with said shaft 46 and meshes, when moved, with teeth 54 of a rack 52. The latter has a boss or projecting portion 56 that serves as a bearing and that has a hole 58 extending laterally thereinto later referred to. Said rack 52 has another boss or projecting portion 60 that has a hole 62 extending laterally thereinto and an actuating finger 66 is set in said latter hole 62 and extends beyond said rack 52 to measure depth of a tire tread.

A casing or housing 68 has a laterally extending hole 72 through a side and through which said finger 66 projects. A rim 70 is spaced interiorly from said housing periphery and receives said crystal 38. A pin 74 is set in said housing 68 and projects inwardly, later referred to. A compression spring 76 extends around said pin 74 and beyond, entering said hole 58 and bearing against the interior of said boss 56.

I preferably provide reset means for said indicating means and which has an actuating lever 80 that movably extends through a slot 82 in said rim 70 and it has a knob 84 interiorly of the latter. Said lever 80 has an end 86 and outwardly thereof is a pivot pin 88 set in said hole 22 on which said lever 80 pivotally moves circumferentially to the extent permitted by said slot 82.

Carried by said lever end 86 is retaining means having a spring bar 90 that is between said spacer 18 and boss 56 and movably bears against both. This bar 90 has a flat retaining portion 91. Said retaining means includes another spring bar portion 92 that movably bears against a bearing pin 94 that is set in said housing 68. Screws 96 hold said bars 90 and 92 to said lever end 86.

In operation, said actuating finger 66 is pushed into the usual space between two outer or non-skid portions of a tire until said housing 68 bears on the tire's outer surface and thus terminates entry of said finger 66. This moves said rack 52, thus rotating said pinion 48, gears 40 and 44, and indicating pointer 30 to thus obtain a reading of the depth of penetration into the tire. When said rack 52 is moved by pressure of said finger 66 movement of said boss 56 compresses said spring 76. This moves said reset lever 80 counterclockwise in said slot 82 and it remains in that retaining position while a reading is obtained from the pointer 30 and dial face 28. This reading or indicating position of said indicating means is retained by a contact under pressure of said boss 56 with said flat portion 91 of said bar 90.

Upon pushing said reset lever 80 in a clockwise direction said bar 90 is moved to free said boss 56 so that said rack 52 will return to normal position by pressure of said spring 76.

What I claim is:

1. A gauge to measure tread depth of a tire comprising a housing, a mounting supported by said housing, indicating means movably supported by said mounting and having an indicia face and a pointer opposite said face, an actuating member connected to and adapted to actuate said face, an actuating member connected to and adapted to actuate asid means from a normal to a reading or indicating position to indicate the depth of a tire tread, and further comprising retaining means for retaining the indicating means in the reading or indicating position, reset means for returnng said indicating means from the retained to normal position operably connected to said indicating means and embodying a lever having one end within said housing and an opposite end movably extending outside of said indicating means, said retaining means being carried by said lever, and having a first member and a second member connected together and fixedly attached to said lever at one end of the latter within said housing, said indicating means having a first bearing member bearing against said first member, a second bearing member supported by said housing and bearing against said first member to maintain said lever in retaining position to obtain a reading, a third bearing member spaced from said first bearing member and supported by said housing and bearing against said second member, said first member being adapted upon actuation of said indicating means to be moved to retaining position while bearing against said first and second bearing members, said first member being adapted upon actuation of said lever to be moved from retaining position to normal position, and spring means supported by said housing and bearing against said first bearing member and adapted to force said latter member from said retaining position to said normal position and thereby move said indicating means to normal position.

2. A gauge to measure tread depth of a tire as set forth in claim 1, said retaining means first member having a flat retaining portion, said first bearing member bearing against the latter when said retaining means is in retaining position.

References Cited
UNITED STATES PATENTS

| | | | |
|---|---|---|---|
| 2,663,945 | 12/1953 | Emery | 33—172 |
| 2,533,522 | 12/1950 | Sisson | 33—172 |
| 2,287,273 | 6/1942 | Rabb | 33—172 |
| 925,814 | 6/1909 | Jones | 116—129 |

LEONARD FORMAN, *Primary Examiner.*

R. A. FIELDS, *Assistant Examiner.*

UNITED STATES PATENT OFFICE
CERTIFICATE OF CORRECTION

Patent No. 3,435,530

April 1, 1969

Andrew J. White

It is certified that error appears in the above identified patent and that said Letters Patent are hereby corrected as shown below:

Column 2, lines 55 to 57, cancel "an actuating member connected to and adapted to actuate said face,"; line 58, "asid" should read -- said --.

Signed and sealed this 31st day of March 1970.

(SEAL)
Attest:

Edward M. Fletcher, Jr.

Attesting Officer

WILLIAM E. SCHUYLER, JI

Commissioner of Patent